US006886054B2

(12) United States Patent
Taninaka et al.

(10) Patent No.: US 6,886,054 B2
(45) Date of Patent: Apr. 26, 2005

(54) STORAGE SYSTEM, SWITCH, STORAGE MEDIUM HAVING A PROGRAM, STORAGE SYSTEM MANAGEMENT METHOD TO MANAGE DATA FRAMES OUTPUT FROM A SWITCH TO STORAGE LOCATIONS USING CORRESPONDENCE DATA IN A SWITCH

(75) Inventors: Dai Taninaka, Odawara (JP); Tatsuya Murakami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 10/435,136

(22) Filed: May 9, 2003

(65) Prior Publication Data

US 2004/0024964 A1 Feb. 5, 2004

(30) Foreign Application Priority Data

May 9, 2002 (JP) ........................................ 2002-134605

(51) Int. Cl.[7] ................................................. G06F 3/00
(52) U.S. Cl. ........................ 710/52; 710/316; 709/219; 709/220; 709/250; 711/114; 711/130; 711/161; 370/389
(58) Field of Search ................... 710/52, 316; 709/219, 709/220, 250; 711/114, 130, 161; 370/389

(56) References Cited

U.S. PATENT DOCUMENTS

| 6,295,575 | B1 | | 9/2001 | Blumenau et al. | |
|---|---|---|---|---|---|
| 6,542,961 | B1 | | 4/2003 | Matsinami et al. | |
| 6,584,106 | B1 | * | 6/2003 | Merchant et al. | 370/395.32 |
| 2001/0054093 | A1 | * | 12/2001 | Iwatani | 709/223 |
| 2002/0007445 | A1 | | 1/2002 | Blumenau et al. | |
| 2003/0002503 | A1 | * | 1/2003 | Brewer et al. | 370/392 |
| 2003/0016624 | A1 | * | 1/2003 | Bare | 370/217 |
| 2003/0033427 | A1 | * | 2/2003 | Brahmaroutu | 709/238 |
| 2003/0158966 | A1 | | 8/2003 | Sato et al. | |
| 2003/0208589 | A1 | * | 11/2003 | Yamamoto | 709/224 |
| 2003/0212711 | A1 | | 11/2003 | Fujibayashi et al. | |

FOREIGN PATENT DOCUMENTS

| JP | 07-295890 | 11/1995 |
|---|---|---|
| JP | 2001-033790 | 2/2001 |
| JP | 2002-007304 | 1/2002 |
| JP | 2002-091706 | 3/2002 |

OTHER PUBLICATIONS

Brocade ZONING A service for extra control of the SAN, 1998, Brocade Communication Systems, Inc.*
Christensen "Building a Storage—Area Network," Network Magazine, http://www.networkmagazine.com, Apr. 21, 1998.

* cited by examiner

Primary Examiner—Kim Huynh
Assistant Examiner—Justin Knapp
(74) Attorney, Agent, or Firm—Townsend and Townsend and Crew LLP

(57) ABSTRACT

A storage system includes storage devices having connection ports and logical device groups connected to each connection port, and a switch having a plurality of switch ports to which the storage devices can be connected via their connection ports and, when a data frame is input to one of the switch ports, being capable of outputting that data frame from either one of the switch ports connected to one of the connection ports to which that data frame is to be sent according to a destination specified in that data frame. The switch stores a table that defines a correspondence between the destination and the connection port. In rearranging data stored in one logical device group to another logical device group, a management server connected to the switch sends an update request to the switch and makes it update the correspondence in the table.

19 Claims, 9 Drawing Sheets connection port management table 400

| switch port address | port No. |
|---|---|
| 011200 | CL1-A |
| 011300 | CL1-B |
| 011400 | CL1-C |
| 011500 | CL2-A |
| 011600 | CL2-B |
| 011700 | CL2-C |

410    420

Fig. 4 data transfer management table 500

| | destination address | | transfer-target address |
|---|---|---|---|
| 1 | 011300 | → | 011600 |
| 2 | 011600 | → | 011300 |
| | | | |
| | | | |
| | | | |
| | | | |

510    520

Fig. 5 logical device management table 600

| switch port address | port No | logical device group No. | logical device path | access frequency | average access frequency | current usage amount of logical device group | physical device location information |
|---|---|---|---|---|---|---|---|
| 011200 | CL1-A | 01 | 01 | 500 | 280 | 60GB | HDD01SEC01 |
| 011200 | CL1-A | 01 | 02 | 250 | | | HDD03SEC04 |
| 011200 | CL1-A | 01 | 03 | 120 | | | HDD01SEC02 |
| 011200 | CL1-A | 01 | 04 | 250 | | | HDD01SEC03 |
| 011300 | CL1-B | 02 | 01 | 10 | 22.5 | 70GB | HDD02SEC03 |
| 011300 | CL1-B | 02 | 02 | 60 | | | HDD03SEC01 |
| 011300 | CL1-B | 02 | 03 | 0 | | | HDD03SEC02 |
| 011300 | CL1-B | 02 | 04 | 20 | | | HDD02SEC01 |
| 011400 | CL1-C | 03 | 01 | 75 | 121.25 | 50GB | HDD01SEC02 |
| 011400 | CL1-C | 03 | 02 | 300 | | | HDD03SEC02 |
| 011400 | CL1-C | 03 | 03 | 50 | | | HDD02SEC03 |
| 011400 | CL1-C | 03 | 04 | 60 | | | HDD03SEC04 |

Fig. 7A management server table 700

| switch port address (710) | connection port No. (720) | storage device No. (730) | LDEV group No. (740) | average access frequency (750) | current usage amount of LDEV group (760) | response speed of LDEV group (770) | total capacity of LDEV group (780) | |
|---|---|---|---|---|---|---|---|---|
| 011200 | CL1-A | 01 | 01 | 280 | 60GB | 100ms | 100GB | (←logical device group A) |
| 011300 | CL1-B | 01 | 02 | 22.5 | 70GB | 80ms | 75GB | |
| 011400 | CL1-C | 01 | 03 | 121.25 | 50GB | 75ms | 80GB | |
| 011500 | CL2-A | 02 | 01 | 162.5 | 25GB | 20ms | 50GB | (←logical device group B) |
| 011600 | CL2-B | 02 | 02 | 205 | 60GB | 30ms | 80GB | |
| 011700 | CL2-C | 02 | 03 | 108.75 | 20GB | 40ms | 40GB | |

Fig. 7B

| switch port address | connection port No. | storage device No. | LDEV group No. | average access frequency | current usage amount of LDEV group | response speed of LDEV group | total capacity of LDEV group | |
|---|---|---|---|---|---|---|---|---|
| 011200 | CL1-A | 01 | 01 | 280 | 60GB | 100ms | 100GB | (←logical device group B) |
| 011300 | CL1-B | 02 | 02 | 205 | 60GB | 30ms | 80GB | |
| 011400 | CL1-C | 01 | 03 | 121.25 | 50GB | 75ms | 80GB | |
| 011500 | CL2-A | 02 | 01 | 162.5 | 25GB | 20ms | 50GB | (←logical device group A) |
| 011600 | CL2-B | 01 | 02 | 22.5 | 70GB | 80ms | 75GB | |
| 011700 | CL2-C | 02 | 03 | 108.75 | 20GB | 40ms | 40GB | |

STORAGE SYSTEM, SWITCH, STORAGE MEDIUM HAVING A PROGRAM, STORAGE SYSTEM MANAGEMENT METHOD TO MANAGE DATA FRAMES OUTPUT FROM A SWITCH TO STORAGE LOCATIONS USING CORRESPONDENCE DATA IN A SWITCH

CROSS-REFERENCE TO RELATED APPLICATIONS

The present application claims priority upon Japanese Patent Application No. 2002-134605 filed May 9, 2002, which is herein incorporated by reference.

BACKGROUND OF THE INVENTION

1. Field of the Invention

The present invention relates to a storage system management method, a storage system, a switch, and a storage medium having a program recorded thereon.

2. Description of the Related Art

Due to the recent development in the IT industry and progress in Internet technology, the amount of data being exchanged on networks is rapidly increasing. With this increase in data amount, a need has arisen to enlarge the capacity of storage devices that are provided for storing data. In order to fulfill such a need, large-capacity storage devices, such as disk array devices that have a multitude of physical devices (e.g., magnetic disks), have been contrived.

The physical drives that are installed in a disk array device may each have different performances, such as disk capacity and response time. A way of efficiently using the overall resources of such a storage device is disclosed, for example, in Japanese Patent Application Laid-open Publication No. JP-07-295890-A. The reference discloses a method for comparing, in a single storage device, the performance of each physical drive ("disk device") and the access performance of each of the access paths between a host computer and each of the disk devices, and storing data in a disk device that matches the access performance.

In order to store and manage a large amount of data using the Internet, so-called iDCs (Internet data centers) are recently gaining popularity. In an iDC, a storage system is built by connecting a plurality of storage devices across an appropriate network such as a SAN (storage area network). Currently, there is a great demand for a technique that enables efficient and effective use of the all of resources in such a system. However, the method according to JP-07-295890-A discloses only a method of sharing resources in a single storage device and does not disclose a way of sharing resources throughout the whole system so that the resources can be used across ports and/or storage devices.

An object of the present invention is to provide a way of efficiently using the resources of a storage system.

SUMMARY OF THE INVENTION

One aspect of the present invention is a method of managing a storage system that includes at least one storage device having at least one connection port and at least one storage volume connected to each connection port, and a switch having at least two switch ports to which the storage device can be connected via the connection port of the same and, when a data frame is input to one of the switch ports, being capable of outputting that data frame from either one of the switch ports connected to one of the connection port to which that data frame is to be sent according to a destination specified in that data frame. The method comprises: the switch storing a correspondence X that defines a correspondence between the destination and the connection port; the switch receiving an update request that is input to the switch from outside; and the switch updating the correspondence X based on the update request.

One effect that can be obtained by such a configuration is that it becomes possible to, for example, effectively use resources in a storage system comprising a switch and at least one storage device.

Features and objects of the present invention other than the above will become clear by reading the description of the present specification with reference to the accompanying drawings.

BRIEF DESCRIPTION OF THE DRAWINGS

To help understanding of the present invention and the advantages thereof, reference is now made to the following description taken in conjunction with the accompanying drawings wherein:

FIG. 4 is a diagram showing an example of a connection port management table stored in the switch according to the embodiment;

FIG. 5 is a diagram showing an example of a data transfer management table stored in the switch according to the embodiment;

FIG. 6 is a diagram showing an example of a logical device management table stored in the storage device according to the embodiment;

FIGS. 7A and 7B are diagrams showing an example of a management server table stored in a management server according to the embodiment;

DETAILED DESCRIPTION OF THE INVENTION

Figure 1:
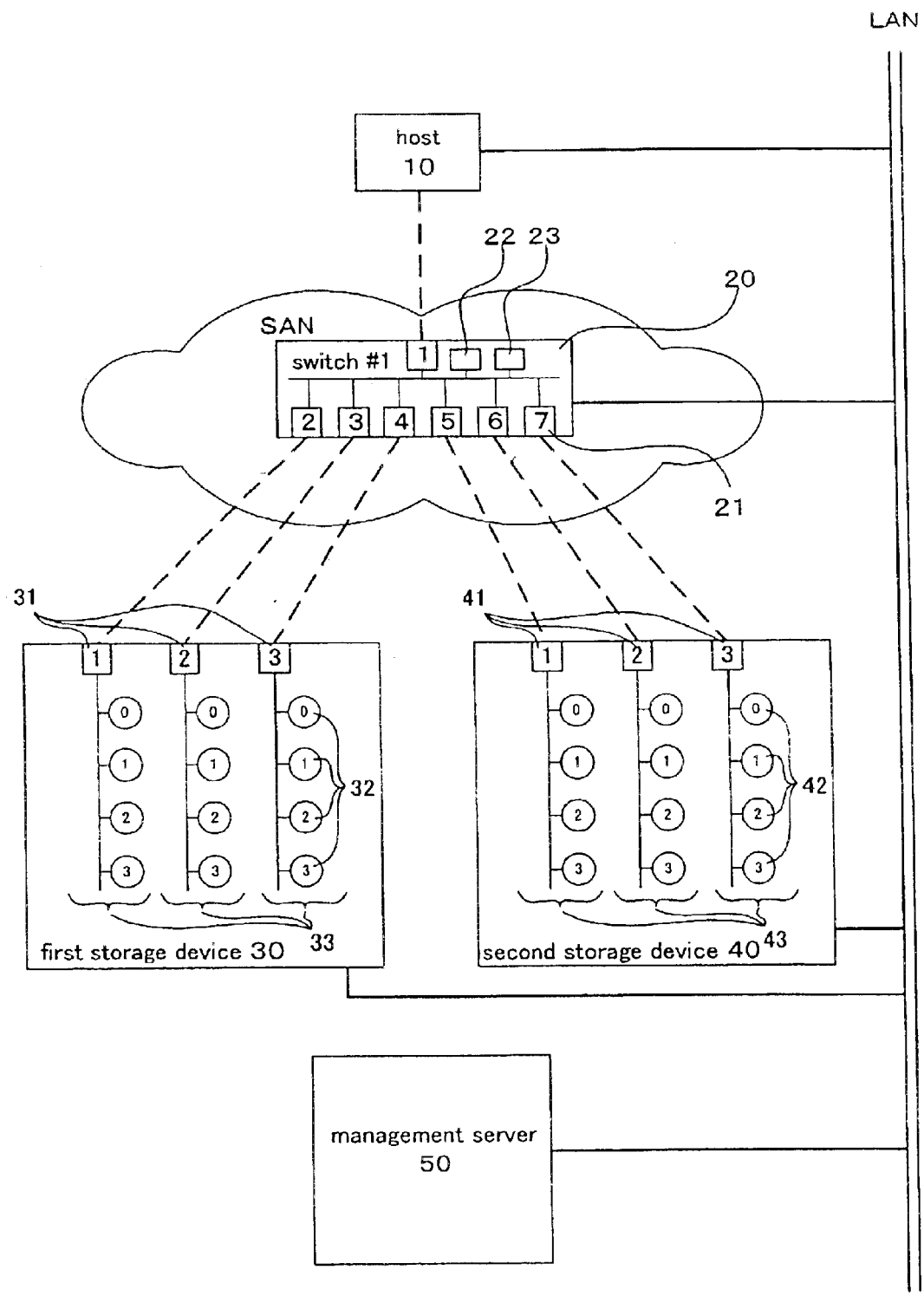
FIG. 1 is a diagram schematically showing a configuration of a storage system according to one embodiment of the present invention.

At least the following matters will be made clear by the explanation in the present specification and the description of the accompanying drawings.

Brief Outline of the Invention

One aspect of the present invention is a method of managing a storage system that includes at least one storage device having at least one connection port and at least one storage volume connected to each connection port, and a switch having at least two switch ports to which the storage device can be connected via the connection port of the same and, when a data frame is input to one of the switch ports, being capable of outputting that data frame from either one of the switch ports connected to one of the connection port to which that data frame is to be sent according to a destination specified in that data frame. The method comprises: the switch storing a correspondence X that defines a correspondence between the destination and the connection port; the switch receiving an update request that is input to the switch from outside; and the switch updating the correspondence X based on the update request.

In the description above, the "storage volume" means a unit in which data is stored and/or managed, such as a physical drive (disk device) installed in the storage device, a physical drive group comprising several physical drives, a logical device which is a logical storage region logically arranged on a physical storage region provided by at least one physical device, and a logical device group comprising several logical devices. The "data frame" may be a frame defined according to the Fibre Channel protocol, or data of other formats if other protocols are to be used. The "correspondence X" may be a table or other such means provided in the switch; it may be installed (stored) to the switch after building the storage system, or it may be stored in the switch in advance before building the storage system.

According to such a configuration, it becomes possible to, for example, efficiently use the resources in a storage system comprising a switch and at least one storage device.

In a second aspect of the present invention, preferably, the update request includes a message instructing to update the correspondence X to enable the switch, when the switch receives a data frame that designates, as its destination, one of the connection port to which a certain one of the storage volume is connected, to output that data frame from one of the switch ports that is connected to one of the connection port to which one of the storage volume other than the certain storage volume is connected, and the switch updates the correspondence x according to the message.

According to such a configuration, it becomes possible to, for example, appropriately locate data across the framework of connection ports and/or storage devices.

In a third aspect of the present invention, preferably, a management server for inputting the update request to the switch is connected to the switch, and the method further comprises: the management server determining a transfer-source storage volume from which data is transferred and a transfer-target storage volume to which the data is transferred when performing an operational change to make data stored in one of the storage volume be stored in another the storage volume; the management server storing a correspondence Y that defines a correspondence between the connection port and the switch port and a correspondence Z that defines a correspondence between the connection port and the storage volume; and the management server creating the update request based on information about the transfer-source storage volume and the transfer-target storage volume that have been determined, the correspondence Y, and the correspondence Z.

In the description above, the "management server" may be any kind of computer as long as it is connected to the switch; in the following embodiments, the "management server" means both the host computer 10 and the management server 50. Further, the term "operational change" means, for example, data transfer such as copying of data and exchanging (rearranging or swapping) of data. The "correspondence Y" and "correspondence Z" may be a table/tables or other such means provided in the management server; they may be installed (stored) to the management server after building the storage system, or they may be stored in the management server in advance before building the storage system.

According to such a configuration, since an update request instructing to update the correspondence between the destination of the data frame and the connection port when performing operational change of the data stored in the storage volume, it becomes possible to, for example, efficiently manage and/or use the data in the storage device.

In a fourth aspect of the present invention, preferably, the management server has a user interface, and the method further comprises: the management server determining the transfer-source storage volume and the transfer-target storage volume based on an input from the user interface.

According to such a configuration, since a user of the management server can be involved in the operational change of a storage volume, it becomes possible to, for example, operate and manage the storage system in a more flexible manner.

In a fifth aspect of the present invention, preferably, the management server is connected to the storage device, and the method further comprises: the storage device sending to the management server information about a usage state of each storage volume provided in that storage device; the management server receiving the information about the usage state; and the management server determining the transfer-source storage volume and the transfer-target storage volume based on the information about the usage state.

In a sixth aspect of the present invention, preferably, the usage state is an input/output frequency of data being input/output to/from each storage volume. In a seventh aspect of the present invention, preferably, the usage state is a remaining capacity of each storage volume.

In the description above, the term "input/output frequency of data" can mean a frequency of accessing a storage volume, such as the number of read/write requests from the host computer 10 to each of the logical devices 32, 42, and the usage rate of a path between a channel adapter (described later) and a disk adapter (described later).

According to such a configuration, since the management server can automatically perform operational change of a storage volume according to the usage state of the storage volume, it becomes possible to, for example, operate and manage the storage system in a more flexible and efficient manner.

In an eighth aspect of the present invention, preferably, the method further comprises: selecting, as the transfer-target storage volume, one of the storage volume provided in the same storage device as the transfer-source storage volume in priority over a storage volume provided in a different storage device.

According to such a configuration, by appropriately locating the data in the storage system according to the user's needs, it becomes possible to, for example, efficiently use the overall system.

In a ninth aspect of the present invention, preferably, the transfer-source storage volume and the transfer-target storage volume are provided in different ones of the storage device.

According to such a configuration, it becomes possible to, for example, locate data across the framework of storage devices.

In a tenth aspect of the present invention, preferably, the method further comprises: the management server transferring the data stored in the transfer-source storage volume to the transfer-target storage volume across the switch.

According to such a configuration, by transferring data across the switch, there is an effect that, for example, it is unnecessary to provide any additional equipment for connecting the storage devices.

In an eleventh aspect of the present invention, preferably, the storage volume is a logical storage region that is logically arranged on a physical storage region provided by at least one physical device provided in the storage device.

By using not only a physical device but also a logical device as a storage volume, which is a unit in which data is stored and/or managed, it becomes possible to, for example, enhance flexibility and scalability in building a storage system.

In a twelfth aspect of the present invention, preferably, the switch is a Fibre Channel switch.

By using a Fibre Channel switch, it becomes possible to, for example, build a SAN (storage area network) and provide an efficient storage system.

In a thirteenth aspect of the present invention, preferably, the switch is configured by connecting at least two switches in a cascade connection, and the method further comprises: each of the switches storing the correspondence X that defines a correspondence between the destination and the connection port, receiving the update request that is input to each of the switches from outside, and updating the correspondence X that each of the switches stores based on the update request.

According to such a configuration, it becomes possible to, for example, install a larger number of resources to a storage system, making it possible to enlarge the scale of the whole system.

A fourteenth aspect of the present invention relates to a storage system comprising: at least one storage device having at least one connection port, and at least one storage volume connected to each connection port; and a switch having at least two switch ports to which the storage device can be connected via the connection port of the same, an output unit outputting, when a data frame is input to one of the switch ports, the data frame from either one of the switch ports connected to one of the connection port to which that data frame is to be sent according to a destination specified in that data frame, a memory storing a correspondence X that defines a correspondence between the destination and the connection port, and a processor receiving an update request that is input to the switch from outside and updating the correspondence X based on the update request.

A fifteenth aspect of the present invention relates to a switch comprising: at least two switch ports to which at least one storage device having at least one connection port can be connected via the connection port of the same; an output unit outputting, when a data frame is input to one of the switch ports, the data frame from either one of the switch ports connected to one of the connection port to which that data frame is to be sent according to a destination specified in that data frame; a memory storing a correspondence X that defines a correspondence between the destination and the connection port; and a processor receiving an update request that is input to the switch from outside and updating the correspondence X based on the update request.

A sixteenth aspect of the present invention relates to a computer-readable storage medium having a program recorded thereon, the program causing a switch provided in a storage system that includes at least one storage device having at least one connection port and at least one storage volume connected to each connection port, and the switch having at least two switch ports to which the storage device can be connected via the connection port of the same and, when a data frame is input to one of the switch ports, being capable of outputting that data frame from either one of the switch ports connected to one of the connection port to which that data frame is to be sent according to a destination specified in that data frame to execute: storing a correspondence X that defines a correspondence between the destination and the connection port; receiving an update request that is input to the switch from outside; and updating the correspondence X based on the update request.

A seventeenth aspect of the present invention relates to a computer-readable storage medium having a program recorded thereon, the program causing a management server provided in a storage system that includes at least one storage device having at least one connection port and at least one storage volume connected to each connection port, a switch having at least two switch ports to which the storage device can be connected via the connection port of the same and, when a data frame is input to one of the switch ports, being capable of outputting that data frame from either one of the switch ports connected to one of the connection port to which that data frame is to be sent according to a destination specified in that data frame, and the management server connected to the switch for inputting the update request to the switch to execute: determining a transfer-source storage volume from which data is transferred and a transfer-target storage volume to which the data is transferred when performing an operational change to make data stored in one of the storage volume be stored in another the storage volume; storing a correspondence Y that defines a correspondence between the connection port and the switch port and a correspondence Z that defines a correspondence between the connection port and the storage volume; and creating the update request based on information about the transfer-source storage volume and the transfer-target storage volume that have been determined, the correspondence Y, and the correspondence Z.

Configuration Example of Storage System

FIG. 1 shows a schematic configuration of a storage system according to one embodiment of the present invention. A host computer 10, a Fibre Channel switch 20, and two storage devices (a first storage device 30 and a second storage device 40) are connected with each other via Fibre Channel. As shown in FIG. 1, a management server 50 is connected to each of the host computer 10, the switch 20, the first storage device 30, and the second storage device 40 via a LAN.

The switch 20 has a plurality of ports 21. The ports of the switch 20 are referred to herein as "switch ports". In the present embodiment, these switch ports 21 function as F_Ports defined by Fibre Channel. The switch 20 also comprises a memory 22 and a processor 23. The memory 22 stores the correspondence, such as a data destination management table 500 described later, for associating the destination of a data frame (such as a Fibre Channel frame) received by the switch 20 and the port to which the frame is sent (or the port from which the frame is sent). The processor 23 executes processes such as control of the switch port 21 and data input/output. The processor 23 or any one of the switch ports 21 may independently function as the "output unit", or the processor 23 and the switch ports 21 may together function as the "output unit".

The storage devices 30, 40 will now be described. The storage devices 30, 40 comprise a plurality of ports 31, 41, respectively. The ports of the storage devices 30, 40 are referred to herein as "connection ports". In the present embodiment, these connection ports 31, 41 function as N_Ports defined by Fibre Channel. A unique port number is assigned to each of the connection ports. To each of the connection ports 31, 41 of the storage devices 30, 40 are connected ports #2 through #7 of the switch 20. The first and second storage devices 30, 40 have many logical devices 32, 42, respectively (indicated by circles in the figure). The logical devices 32 are logical storage regions that are logically arranged on physical storage regions provided by at least one physical device 300 (described later) installed in the first storage device 30; the logical devices 42 are logical storage regions that are logically arranged on physical storage regions provided by at least one physical device 300 (described later) installed in the second storage device 40. The logical devices 32 are grouped into several logical device groups (LDEV groups) 33, and each of the logical device groups 33 is connected to one of the connection ports 31. In the same way, the logical devices 42 are grouped into several logical device groups (LDEV groups) 43, and each of the logical device groups 43 is connected to one of the connection ports 41.

Next, the hardware configuration of the first storage device 30 is described with reference to FIG. 2. The first storage device 30 comprises a multitude of physical devices 300 (such as magnetic disks) that form a disk array, and a storage controller 310 for controlling these physical devices 300. The storage controller 310 comprises: channel adapters 311 for controlling each of the ports (which are referred to as CHAs in the figure); disk adapters 312 for controlling the physical devices 300 (which are referred to as DKAs in the figure); a cache memory 313; and a shared memory 314. Further, a logical device management table 600 (described later) is stored in the shared memory 314. The logical device management table 600 indicates how the logical devices 32 are arranged in the physical devices 300. It should be noted that, since the second storage device 40 has the same configuration as that of the first storage device 30, explanation thereof is omitted.

Figure 2:
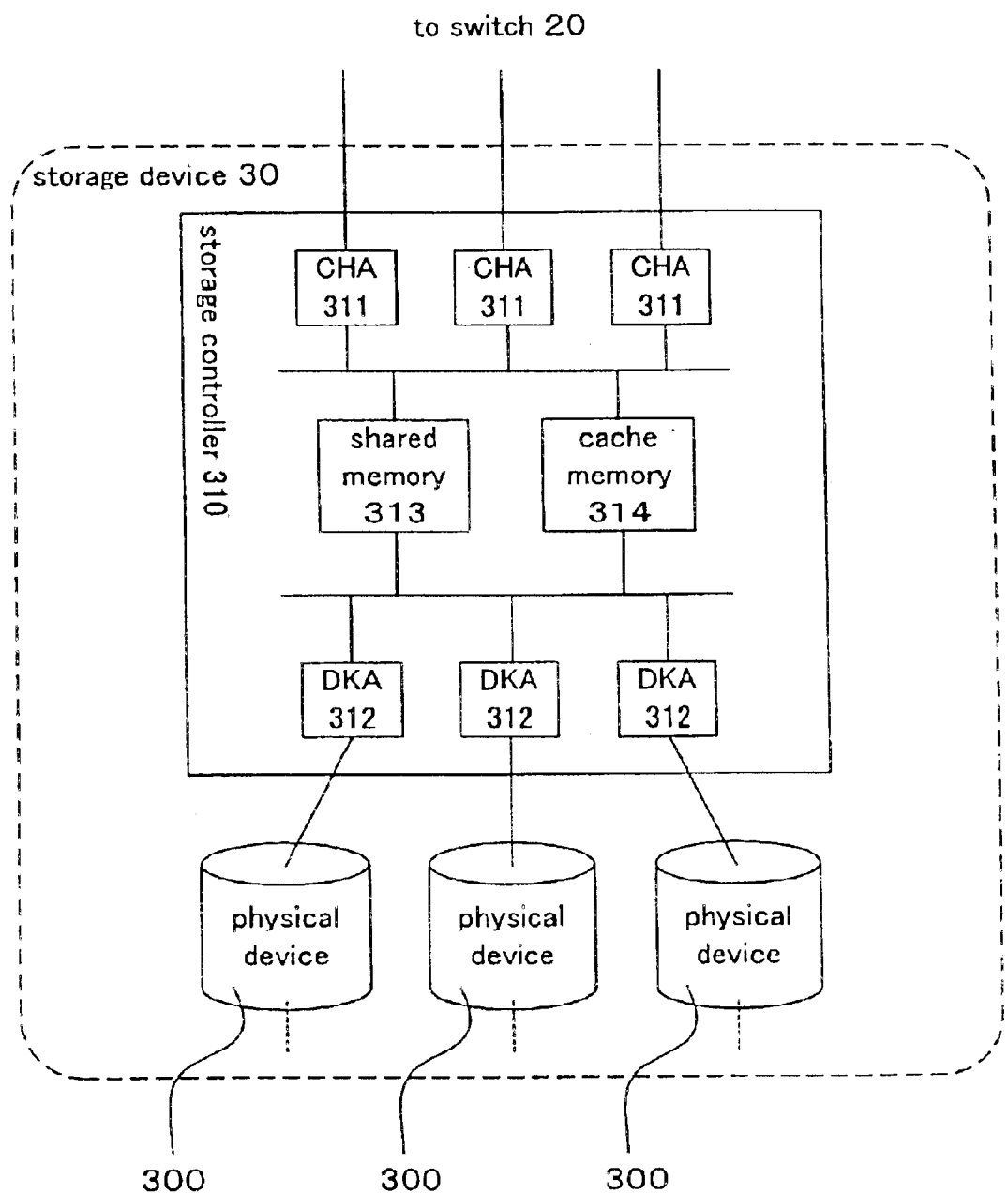
FIG. 2 is a block diagram showing an example of a configuration of a storage device according to the embodiment.

Further, in FIG. 2, the first storage device 30 is shown to have the physical devices 300 and the storage controller 310 in the same housing. However, the storage device 30 does not have to be configured in this way, and the physical devices 300 and the storage controller 310 can be provided independently. Further, the plurality of physical devices 300 can configure a RAID (Redundant Array of Independent Disks).

The host computer 10 may be any kind of computer, such as a mainframe, an open server based on a UNIX (trademark) platform, and a PC server. The host computer 10 has a port connected to one of the switch ports 21.

The management server 50 can also be any kind of computer. As described later, the management server 50 is capable of realizing many functions, such as checking the usage state of the storage devices 30, 40, and sending various commands/requests to the switch 20 and/or the storage devices 30, 40. In order to realize such functions, the management server 50 has, for example, a memory for storing various tables, and a processor for enabling those functions. The host computer 10 may also serve as the management server 50.

Description of the Tables and Data Structure

Figure 3:
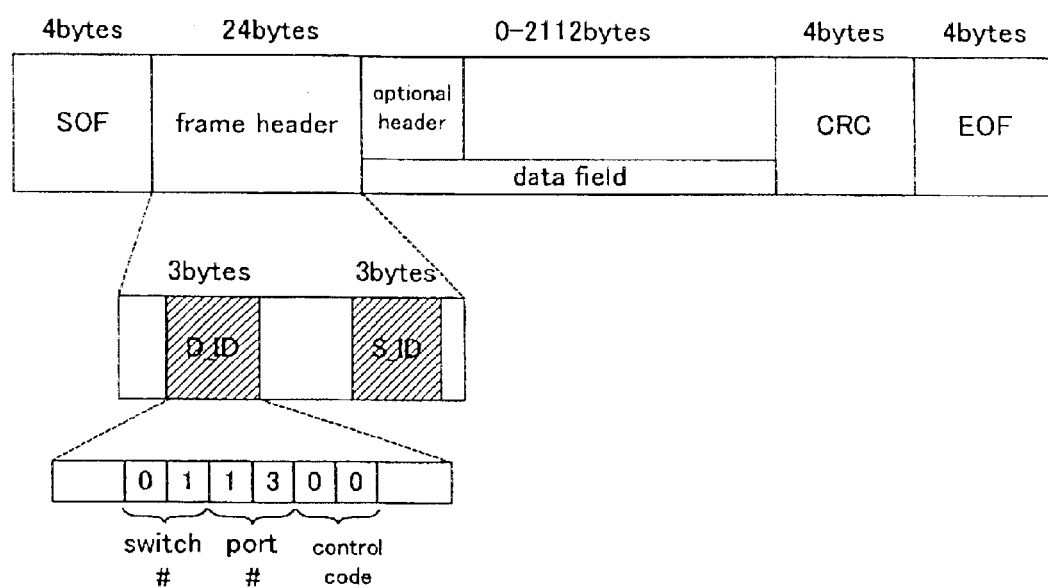
FIG. 3 is a diagram showing an example of a configuration of a data frame received by a switch according to the embodiment.

FIG. 3 shows an example of the data structure of a data frame received by the switch 20. In the present embodiment, the data frame is a Fibre Channel frame; however, this is not a limitation. The header of the Fibre Channel frame includes source address information (Source ID, S_ID) that indicates the sender of the frame, and destination address information (Destination ID, D_ID) that specifies the designation of the frame. The S_ID and the D_ID each include a port address (a source port address and a destination port address, respectively) indicating a switch number (switch #) and a port number (port #). For example, in the present embodiment as shown in FIG. 3, a port address "011300" indicates switch #1 and port #3.

Next, FIG. 4 shows a connection port management table 400 stored in the switch 20. Here, the correspondence between the switch ports 21 of the switch 20 and the connection ports 31, 41 that are connected to each switch port 21 is managed using a switch port address 410 (i.e., a port address of a switch port 21) and a connection port number 420 (i.e., an ID number of each connection port 31, 41).

FIG. 5 shows a data transfer management table 500 (which is an example of a "correspondence X") stored in the switch 20. This table 500 has a destination address field 510 and a transfer-target address field 520. In the designation address field 510 is described a destination port address that indicates the destination specified in the frame received by the switch 20. In the transfer-target address field 520 is described a transfer-target port address indicating where to transfer the received frame. This table 500 functions to define a correspondence between the designation port address (designation) specified in the frame and the connection port that is connected to the switch port corresponding to the transfer-target port address.

For example, the table 500 is used as follows. First, the switch 20 checks whether the destination port address of the received frame is described in the destination address field 510 of the data transfer management table 500. If the destination port address is present in the destination address field 510 of the table 500, the switch 20 looks up and determines the transfer-target port address corresponding to that destination port address with reference to the table 500, and sends the frame from a switch port 21 that corresponds to the transfer-target port address. In this way, the frame is transferred to a connection port 31 (or a connection port 41) that is connected to the switch port 21 corresponding to the transfer-target port address.

Figure 10:
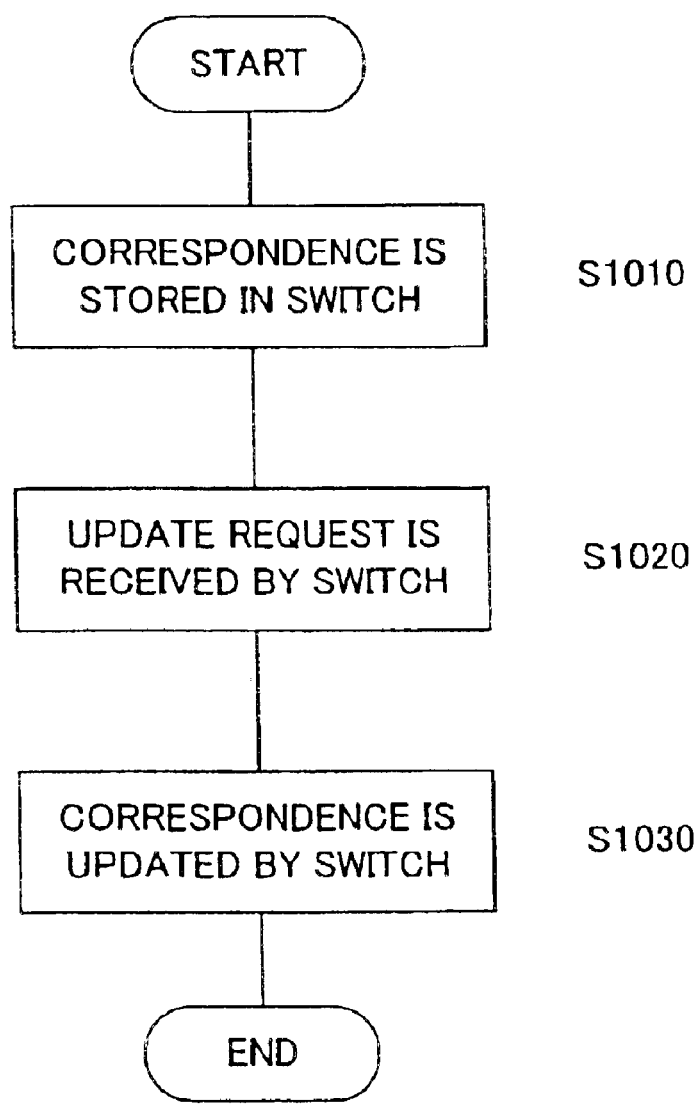
FIG. 10 is a flowchart showing a process of updating the correspondence stored in the switch according to the present invention.

Although the process of updating the correspondence will be described in detail later, this updating process is described in brief below with reference to FIG. 10.

First, the data transfer management table 500 (which is an example of the "correspondence X") is stored in the switch (S1010). The table 500 may be installed (stored) to the switch 20 after building the storage system, or it may be stored in the switch 20 in advance before building the storage system.

Then, at a certain timing, the switch 20 receives an update request from outside the switch 20 (such as from the host computer 10 or the management server 50) (S1020). The update request is for instructing the switch 20 to update the table 500 that defines the correspondence between the destination port address (the destination) and the transfer-target port address (the connection port to which the frame is transferred). Then, the switch 20 updates the table 500 according to this update request (S1030).

By updating the correspondence of the destination port address and the transfer-target port address in the data transfer management table 500 according to an update request sent from outside the switch 20 (such as from the host computer 10 or the management server 50), the correspondence between the designation, which is specified in the frame, and the connection port to which the frame is transferred (the transfer target) is updated.

FIG. 6 shows a logical device management table 600 stored in the storage device 30. The table 600 is provided to associate: a switch port address 610 of a switch port 21 corresponding to a connection port 31; a connection port number 620 which is a unique number assigned to each of the connection ports 31; a logical device group number 630 of a logical device group 33 that is associated with each of the connection ports 31; a logical device path 640 for identifying a path (described later) to each of the logical devices 32 included in each logical device group 33; an access frequency 650 (described later) of each of the logical devices 32; an average access frequency 660 for each of the logical device groups 33; a current usage amount 670 of each of the logical device groups 33; and a physical device location information 680 indicating where each logical device 32 is actually arranged in the physical devices 300.

The term "path to the logical device 32" described above means, for example, a path (route) between a channel adapter 311 and a disk adapter 312, or a path (route) between a channel adapter 311 and a controller (not shown) that the a disk adapter 312 has for the logical devices 32. The "access frequency" of the logical device 32 is, for example, the number of read/write requests from the host computer 10 to each of the logical devices 32, or the usage rate of a logical device path (i.e., the path to the logical device 32) between the channel adapter 311 and the disk adapter 312. A processor (not shown) of the storage controller 310 appropriately measures the access frequency and records the measured value to the logical device management table 600. In the present embodiment, the number of frames sent to each of the logical devices 32 indicates the access frequency of the each logical device 32.

As described above, the logical device management table 60 shown in FIG. 6 is stored in the first storage device 30; it is possible that the second storage device 40 also has a similar table.

FIG. 7A and FIG. 7B show a management server table 700 (which is an example of a "correspondence Y" and a "correspondence Z") stored in the management server 50. FIG. 7A shows a state before performing transferring of data stored in a certain logical device group 33; FIG. 7B shows a state after the data has been transferred. The process of changing the data storage location (the process of transferring the data) will be described later.

The table 700 is provided to associate: a port address 710 of each of the switch ports 21 corresponding to each of the connection ports 31, 41; a port number 720 of each of the connection ports 31, 41; storage device number 730 for identifying each of the storage devices 30, 40; an LDEV group number 740 indicating each of the logical device groups (LDEV groups) 33, 43; an average access frequency 750 for each of the logical device groups 33, 43; a current usage amount of LDEV group 760 indicating the current usage amount of each of the logical device groups 33, 43; a "response speed of LDEV group" 770 (described later) for each of the logical device groups 33, 43; and a "total capacity of LDEV group" 780 (described later) for each of the logical device groups 33, 43. In other words, the management server 50 uses this management server table 700 to store and manage the correspondence between the connection ports 31, 41 and the switch ports 21, and the correspondence between the connection ports 31, 41 and the logical device groups 33, 43.

The "response speed of LDEV group" for each of the logical device groups 33, 43 mentioned above is the response speed of each of the logical device groups 33, 43, and it is a value that is calculated based on the response speed of the physical device(s) 300 in which each of the logical device groups 33, 43 is actually arranged. The "total capacity of LDEV group" for each of the logical device groups 33, 43 mentioned above is a total capacity of storage area of the physical device(s) 300 in which each of the logical device groups 33, 43 is actually arranged (or in other words, the total amount of storage area of the logical devices 32, 42 that make up each of the logical device groups 33, 43). The descriptions "logical device group A" and "logical device group B" in FIG. 7 will be described later.

The storage devices 30, 40 send to the management server 50, at appropriate timings (such as at a preprogrammed time or upon user's request), information about the average access frequency 640 for each of the logical device groups 33, 43 and information about the current usage amount 650 of each of the logical device groups 33, 43. Receiving the information, the management server 50 records the information to the average access frequency field 750 and the current usage amount field 760 of the management server table 700.

Operational Change of Storage Volume and Correspondence Updating

Described below are processes for performing operational changes so that data stored in a certain storage device group 33, 43 is stored in another logical device group 33, 43 and for updating the correspondence between the destination of the frame received by the switch 20 and the connection port 31, 41 to which the frame is to be sent, in order to locate data in appropriate logical device groups 33, 43 across the framework of ports and/or the independent storage devices.

In this example, data stored in a certain logical device group 33, 43 is transferred or copied to another logical device group 33, 43, and data stored in that other logical device group 33, 43 is transferred or copied to the certain logical device group 33, 43; that is, the data in one logical device group 33, 43 and the data in another logical group 33, 43 are exchanged (rearranged or swapped).

At an appropriate timing, such as at a preprogrammed time or when the management server 50 receives some kind of notice from the storage devices 30, 40 based on the usage state (e.g., the remaining capacity or the access frequency of the logical device groups 33, 43), the management server 50 refers to the management server table 700 (see FIG. 7) an compares the average access frequency 750 with the LDEV group response speed 770 of each logical device group 33, 43, and also compares the LDEV group current usage amount 760 with the LDEV group total capacity 780.

The management server 50 checks whether any logical device group 33, 43 is inappropriately being assigned. More specifically, the management server 50 checks, for example, whether a logical device group 33, 43 having a high performance (high response speed) is being used for a logical device group 33, 43 in which the access frequency is actually low (or, conversely, whether a logical device group 33, 43 having a low performance (low response speed) is being used for a logical device group 33, 43 in which the access frequency is actually high). The management server 50 also checks how much remaining capacity each of the logical device group 33, 43 has.

Referring to the table 700 of FIG. 7, it can be seen that the second logical device group 33 of the first storage device 30 (i.e., the one corresponding to the port address "011300"; this group is referred to as "logical device group A" hereinafter and in FIG. 7) is unsuitably assigned, in view of its average access frequency 750 and usage capacity 760 (more specifically, in terms of its capacity being almost full and its actual access frequency being low in spite of its high response speed). Detecting such a situation, in order to transfer the data stored in the logical device group A (i.e., the logical device group 33 which is currently being unsuitably assigned) to a suitable logical device group 33, 43, the management server 50 determines a logical device group 33, 43 to be the target of transfer.

Referring to the table 700 of FIG. 7, in terms of access frequency and the capacity of the logical device group 33, 43, it seems to be appropriate to swap the data in the logical device group A with data stored in the second logical device group 43 of the second storage device 40 (i.e., the one corresponding to the port address "011600"; this group is referred to as "logical device group B" hereinafter and in FIG. 7). In other words, it seems to be appropriate to rearrange or exchange the data between these two logical device groups. Therefore, the logical device group B is determined by the management server 50 to be the transfer-target logical device group to which the data is transferred.

Data rearrangement can be performed as follows.

(1) The management server 50 sends to the second storage device 40 a command instructing the device 40 to make the logical device group B free. After receiving this command, with reference to the LDEV group total capacity 780 of the management server table 700, the processor (not shown) of the second storage device 40 temporary distributedly copies the data currently stored in the logical device group B to some of the other logical device groups 43 in the second storage device 40. The processor also creates in the cache memory a management table (not shown) for managing the order and location in which the data has been distributedly copied and stored to the other logical device groups 43. After making the logical device group B free, the second storage device 40 sends to the management server 50 data reporting that the logical device group B is now free.

(2) The management server 50 sends to the first storage device 30 a command instructing the device 30 to copy the data stored in the logical device group A to the logical device group B. Receiving this command, the processor (not shown) of the first storage device 30 sends the data currently stored in the logical device group A to the logical device group B across the switch 20. After transferring all of the data of the logical device group A, the first storage device 30 sends to the management server 50 data reporting that transfer has finished.

(3) The management server 50 sends to the second storage device 40 a command instructing the device 40 to copy the data that was stored in the logical device group B to the logical device group A, which is now free. After receiving this command, with reference to the management table (not shown), the processor of the second storage device 40 sends the data that was stored in the logical device group B (and which is now distributedly stored in the other logical device groups 43) to the logical device group A. After sending all of the data of the logical device group B, the second storage device 40 sends to the management server 50 data reporting that transfer has finished.

(4) The management server 50 changes the correspondence between the logical device groups A, B and the connection ports 31, 41 in the management server table 700. That is, the management server 50 updates the management server table 700 from a state shown in FIG. 7A to a state shown in FIG. 7B, so that the logical device group A corresponds to the connection port "CL2-B" and the logical device group B corresponds to the connection port "CL1-B".

The data rearrangement of the logical device groups 33, 43 is then finished.

In order for a frame received by the switch 20 to be appropriately transferred in accordance with the state after transfer (as in FIG. 7B) when data rearrangement is performed, the management server 50 sends to the switch 20 an update request instructing the switch 20 to update the data transfer management table 500. This update request includes a message for instructing the switch 20 to write "011300" in the destination address field 510 and "011600" in the transfer-target address field 520 of the first record (the first line) of the table 500, as well as write "011600" in the destination address field 510 and "011300" in the transfer-target address field 520 of the second record (the second line) of the table 500. Receiving this update request, the switch 20 updates the data transfer management table 500 stored in its memory 22 to a state as shown, for example, in FIG. 5.

Then, when the switch 20 receives a frame, the processor 23 of the switch 20 refers to the D_ID of the received frame, detects the destination of the frame, and stores this destination information (the port address in this embodiment) in the cache memory. The processor 23 of the switch 20 also refers to the destination address field 510 of the data transfer management table 500 to check whether the port address of the received frame is written in the destination address field 510 of the table 500.

If the switch port address of the received frame is present in the destination address field 510, the switch 20 then refers to the corresponding transfer-target address field 520 to determine where to transfer the received frame, and sends the frame to an appropriate logical device group 33, 43 corresponding to the transfer-target port address via the switch port 21 having the transfer-target port address.

With reference to FIG. 5, the processes described above will be explained in further detail. If the port address specified in the D_ID of a frame received from the host computer 10 is "011300", the switch 20 will send the received frame to the logical device group, which is now associated with the transfer-target port address "011600" (which is on the other hand associated with the connection port "CL2-B"). On the other hand, if the frame received from the host computer 10 designates port address "011600", then the switch 20 sends the received frame to the logical device group, which is now associated with the transfer-target port address "011300" (which is on the other hand associated with the connection port "CL1-B").

In the configuration described above, each logical device group 33, 43 is identified and managed based on port addresses; therefore, even when transferring or copying data stored in a certain logical device group 33, 43, the transfer-source logical device group 33, 43 from which data is transferred and the transfer-target logical device group 33, 43 to which the data is transferred are specified using the port addresses. Accordingly, it is possible to transfer/copy data stored in one logical device group 33, 43 to another logical device group 33, 43 based only on information that is managed using the port addresses as keys, regardless of whether the transferring/copying is performed in the same storage device 30, 40 or it is performed among a plurality of different storage devices 30, 40.

It should be noted that, although in the embodiment described above, description has been made of an example in which data is rearranged between two logical device groups 33, 43, it is also possible to transfer data stored in one logical device group 33, 43 to an empty logical device group 33, 43 that still has not been used.

Further, in the embodiment described above, description has been made of an example in which the transfer-source logical device group 33, 43 and the transfer-target logical device group 33, 43 belong to different storage devices 30, 40; however, it is possible to give a logical device group 33, 43 that belongs to the same storage device priority to be selected as the transfer-target logical device group 33, 43. For example, the user can operate the host computer 10 and/or the management server 50 to input a command to the management server 50 so that the logical device group 33, 43 belonging to the same storage device is given priority to be selected as the transfer-target group. The management server 50 is set so that, when the management server 50 determines the data-transfer-target group, instead of determining the transfer-target group based on the access frequency and the remaining capacity of the logical device groups 33, 43 (as described above), the management server 50 will select, as the transfer-target group, the logical device group 33, 43 belonging to the same storage device as long as the capacity of that logical device group 33, 43 does not exceed its maximum value.

According to such a configuration, it becomes possible to, for example, appropriately locate the data in the storage system in response to the needs of the user and efficiently use the overall system.

Further, in the embodiment described above, description has been made of an example in which a logical device group 33, 43 made up of a plurality of logical devices 32, 42 is taken as a unit in which data management and data transfer are performed (i.e., as a storage volume); however, it is needless to say that the logical device 32, 42 and/or the physical device can be deemed as the storage volume.

Figure 8:
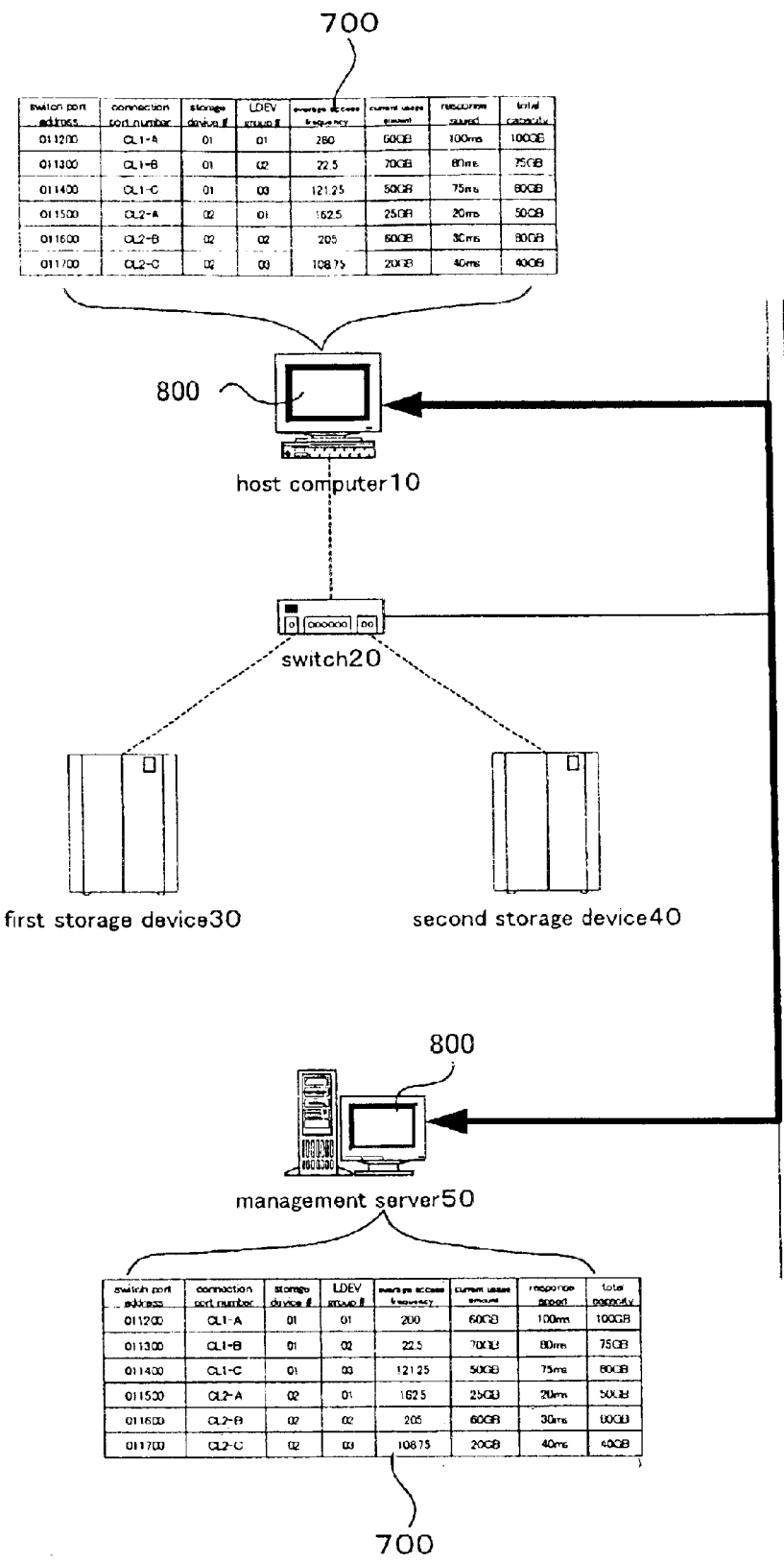
FIG. 8 is a diagram schematically showing a configuration of a storage system according to another embodiment of the present invention.

Further, in the above-described embodiment, description has been made of an example in which the management server 50 "automatically" performs the data rearrangement of the logical device group by checking the characteristics, such as the access frequency and the remaining capacity, of the logical device groups 33, 43; however, for example, a user that operates the host computer 10 and/or the management server 50 can give instructions to the management server 50 to perform the data rearrangement. More specifically, for example, as shown in FIG. 8, the host computer 10 and/or the management server 50 can have a user interface 800 through which a user can browse and operate the management server table 700 of the management server 50 on the host computer 10 and/or the management server 50, and when the user checks the table 700 and decides that there is a need to rearrange the data in the logical device group 33, 43, the user uses the host computer 10 and/or the management server 50 to instruct rearrangement of the logical device group 33, 43 to the management server 50.

According to such a configuration, it becomes possible to perform rearrangement of the logical device group 33, 43 both automatically and manually in response to the user's needs. Therefore, it becomes possible to use the overall storage system in an efficient and flexible manner.

Further, in the embodiment described above, description has been made of an example where, upon transferring data between the logical device groups 33, 43, data to be moved is once distributedly copied to other ones of the logical device groups 33, 43, and then the data is copied to the transfer-target logical device group 33, 43 via the switch 20. However, it is possible to perform rearrangement of the logical device groups 33, 43 by synchronous/asynchronous remote copying disclosed, for example, in Japanese Patent Application Laid-open Publication No. JP-2000-347917-A.

According to such a configuration, it becomes possible to reduce the load on the switch as well as simplify the configuration of, for example, the cabling/wiring of the overall storage system, thereby enhancing the usage efficiency of the system.

Figure 9:
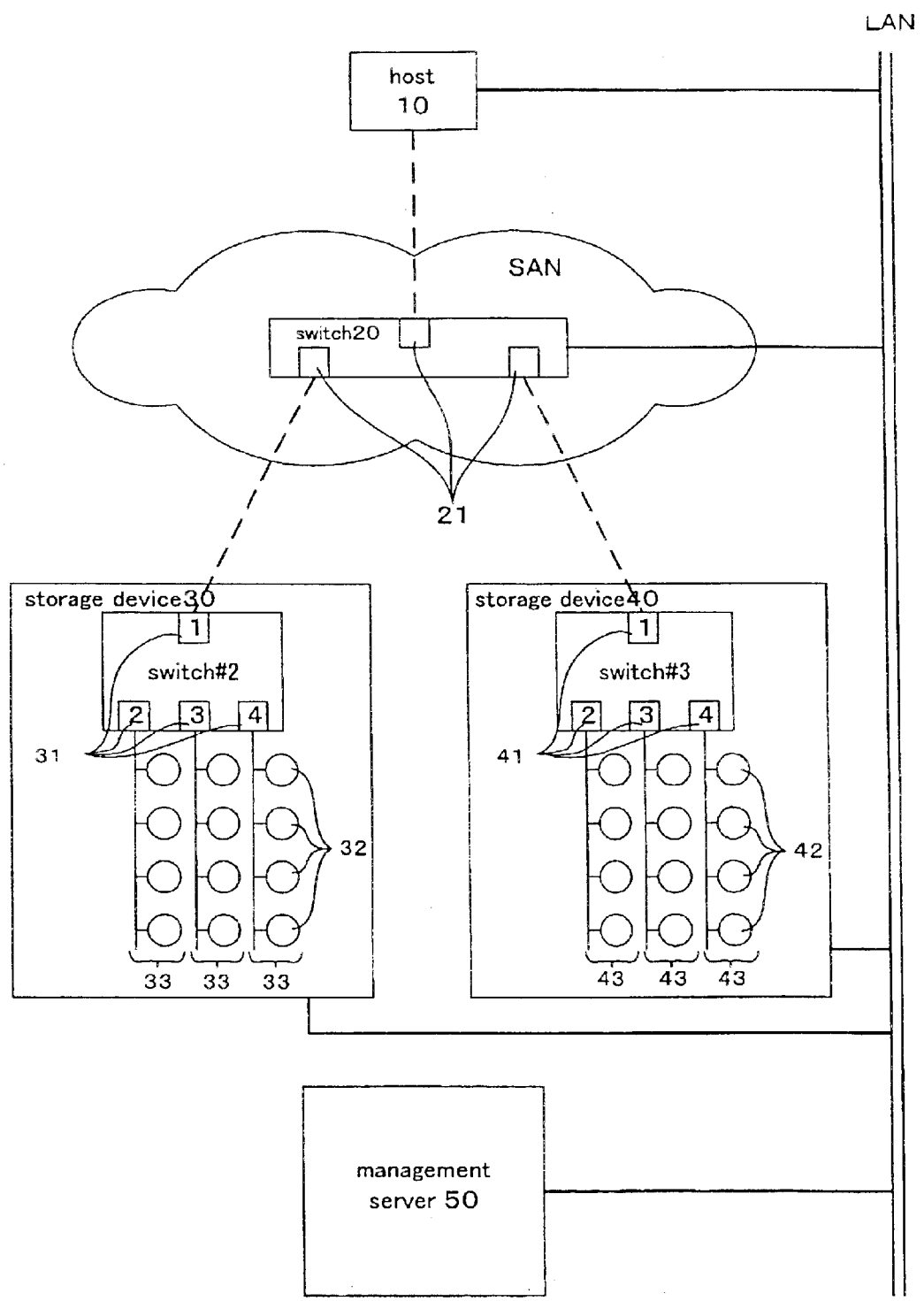
FIG. 9 is a diagram schematically showing a configuration of a storage system according to another embodiment of the present invention.

Further, for example, as shown in FIG. 9, when each of the storage devices 30, 40 has its own switch 34, 44, the plurality of switches 20, 34, 44 will be connected in a cascade connection. That is, the switch ports 21 and the connection ports 31, 41 will be connected according to an E_PORT connection defined by Fibre Channel. In this case, each of the switches 20, 34, 44 will store the correspondence that associates the designation of a received frame and the connection port to which the frame is to be output. When performing the operational change of the storage volume and/or updating the correspondence as described above, the correspondence stored in each switch 20, 34, 44 is updated.

According to such a configuration, it becomes possible to, for example, install a larger number of resources to the storage system, making it possible to enlarge the scale of the whole system.

Further, using the technique disclosed in JP-07-295890-A, it is possible to first rearrange the logical devices 32, 42 within a same storage device to change the configuration of the logical device groups 33, 43, and then perform rearrangement of the logical device groups 33, 43 according to the processes described above.

According to the present invention, it becomes possible to use resources in a storage system more efficiently.

Although preferred embodiments of the present invention have been described in detail, it should be understood that various changes, substitutions and alterations can be made therein without departing from the spirit and scope of the invention as defined by the appended claims.

What is claimed is:

1. A method of managing a storage system that includes
at least one storage device having one or more connection ports, each having one or more storage volumes connected thereto, and
a switch having at least two switch ports to which said storage device can be connected via said connection ports and, in response to receiving a data frame, being operable to output that data frame from one of said switch ports according to a received destination specified in that data frame,
said method comprising:
said switch storing a correspondence X that defines a correspondence between a plurality of first destinations and a plurality of corresponding second destinations, wherein if said received destination is one of said first destinations then that data frame is output from a switch port that is associated with a second destination that corresponds to said received destination, wherein if said received destination is not one of said first destinations then that data frame is output from a switch port that is associated with said received destination;
said switch receiving an update request that is input to said switch from source external to said switch; and said switch updating said correspondence X based on said update request.

2. A method of managing a storage system according to claim 1, wherein said update request includes information representative of one or more third destinations, each of said third destinations having a corresponding fourth destination, and said switch updates said correspondence X by incorporating said third destinations with said plurality of first destinations and by incorporating said fourth destinations with said plurality of second destinations.

3. A method of managing a storage system according to claim 2, wherein a management server for inputting said update request to said switch is connected to said switch, said method further comprising:

said management server determining a transfer-source storage volume from which data is to be transferred and a transfer-target storage volume to which said data is to be transferred in connection with a data exchange operation;

said management server storing a correspondence Y that defines a correspondence between said connection ports and said switch ports, and a correspondence Z that defines a correspondence between said connection ports and said storage volumes; and said management server creating said update request based on said transfer-source storage volume, said transfer-target storage volume, said correspondence Y, and said correspondence Z.

4. A method of managing a storage system according to claim 3, wherein said management server has a user interface, said method further comprising:

said management server determining said transfer-source storage volume and said transfer-target storage volume based on an input from said user interface.

5. A method of managing a storage system according to claim 3, wherein said management server is further connected to said storage device, said method further comprising:

said storage device sending to said management server first information about a usage state for each of said storage volumes provided in that storage device;

said management server receiving said first information; and said management server determining said transfer-source storage volume and said transfer-target storage volume based on said information about the usage state.

6. A method of managing a storage system according to claim 5, wherein said usage state is an input/output frequency of data being exchanged with each of said storage volumes.

7. A method of managing a storage system according to claim 5, wherein said usage state is a remaining capacity in each of said storage volumes.

8. A method of managing a storage system according to claim 5, said method further comprising:

selecting with preference, as said transfer-target storage volume, storage volume provided in the same storage device as said transfer-source storage volume over a storage volume provided in a different storage device.

9. A method of managing a storage system according to claim 3, wherein said transfer-source storage volume and said transfer-target storage volume each is provided in storage device different from the other.

10. A method of managing a storage system according to claim 3, said method further comprising:

said management server transferring data stored in said transfer-source storage volume to said transfer-target storage volume via said switch.

11. A method of managing a storage system according to claim 1, wherein said storage volume is a logical storage region that is logically arranged on a physical storage region provided by at least one physical device provided in said storage device.

12. A method of managing a storage system according to claim 1, wherein said switch is a Fibre Channel switch and said switch ports are N ports.

13. A method of managing a storage system according to claim 12, wherein said switch is configured by connecting at least two switches in a cascade connection, said method further comprising:

each of said switches storing said correspondence X that defines a correspondence between said destination and said connection port, receiving said update request that is input to each of said switches from outside, and updating said correspondence X that each of said switches stores based on said update request.

14. A storage system comprising:

one or more storage devices having:

one or more connection ports, and one or more storage volumes connected to each of said one or more connection ports; and a switch having:

at least two switch ports to which said storage devices can be connected, an output unit outputting a received data frame to one of said switch ports according to an intended destination specified in that received data frame, a memory storing a correspondence X that defines a correspondence between a plurality of first destinations and a plurality of corresponding second destinations, wherein if said intended destination is one of said first destinations then that received data frame is output from a switch port that is associated with a second destination that corresponds to said intended destination, wherein if said intended destination is not one of said first destinations then that received data frame is output from a switch port that is associated with said intended destination, and a processor receiving an update request that is input to said switch from outside and updating said correspondence X based on said update request.

15. In a storage system, a constituent switch component comprising:

at least two switch ports to which at least one storage device having one or more connection ports can be connected;

an output unit outputting a received data frame to one of said switch ports according to an intended destination specified in that received data frame;

a memory storing a correspondence X that defines a correspondence between a between a plurality of first destinations and corresponding second destinations, wherein if said intended destination is one of said first destinations then that received data frame is output from a switch port that is associated with a second destination that corresponds to said intended destination, wherein if said intended destination is not one of said first destinations then that received data frame is output from a switch port that is associated with said intended destination; and a processor receiving an update request that is input to said switch from outside and updating said correspondence X based on said update request.

16. A computer-readable storage medium having a program recorded thereon, said program for operating a switch provided in a storage system that includes one or more storage devices having one or more connection ports and one or more storage volumes connected to said connection ports, and said switch having at least two switch ports to which said storage devices can be connected via said connection ports and, in response to receiving a data frame, being operable to output that data frame from one of said switch ports according to a received destination specified in that data frame, said program operating said switch to execute:

storing a correspondence X that defines a correspondence between a plurality of first destinations and corresponding second destinations, wherein if said received destination is one of said first destinations then that data frame is output from a switch port that is associated with a second destination that corresponds to said received destination, wherein if said received destination is not one of said first destinations then that data frame is output from a switch port that is associated with said received destination;

receiving an update request that is input to said switch from outside; and updating said correspondence X based on said update request.

17. A computer-readable storage medium having a program recorded thereon, said program causing a management server provided in a storage system that includes at least one storage device having one or more connection ports and one or more storage volumes connected to said connection ports, a switch having at least two switch ports to which said storage device can be connected via said connection ports and, in response to receiving a data frame, being operable to output that data frame from one of said switch ports according to a received destination specified in that data frame, and said management server connected to said switch for inputting said update request to said switch to execute:

determining a transfer-source storage volume from which data is to be transferred and a transfer-target storage volume to which said data is to be transferred in connection with a data exchange operation;

storing a correspondence Y that defines a correspondence between said connection ports and said switch ports and a correspondence Z that defines a correspondence between said connection ports and said storage volumes; and creating said update request based on said transfer-source storage volume, said transfer-target storage volume, said correspondence Y, and said correspondence Z.

18. A method of managing a storage system comprising at least one switch and one or more storage devices, each storage device having one or more connection ports, each connection port being associated with one or more storage volumes, said switch having a plurality of switch ports to which said storage devices can be connected by way of said connection ports, the method comprising steps of:

receiving a data frame from a host, said data frame comprising a first destination identifier that corresponds to a first switch port;

storing a correspondence X comprising one or more correspondences, each correspondence comprising a destination identifier and an associated destination identifier;

if said first destination identifier has an associated destination identifier in said correspondence X, then communicating said data frame to a second switch port that corresponds to said associated destination identifier; and if said first destination identifier does not have an associated destination identifier in said correspondence X, then communicating said data frame to said first switch port.

19. The method of claim 18 wherein said switch is a Fibre Channel switch, said switch ports comprise one or more F_port type switch ports and one or more N_port type switch ports, said data frame being received from an F_port type switch port, said first switch port and said second switch port being N_port type switch ports.

* * * * *